(12) United States Patent
Espinosa et al.

(10) Patent No.: US 10,590,906 B2
(45) Date of Patent: Mar. 17, 2020

(54) OSCILLATING DEVICE FOR CONVERTING FLUID KINETIC ENERGY INTO ELECTRICAL ENERGY

(71) Applicants: NWHISPER S.R.L.S., Bergamo (IT); SPIKE 3D CONCEPT ENGINEERING S.A.R.L., Colomiers (FR)

(72) Inventors: Enrico Espinosa, Bergamo (IT); Ferdinando Basile, Aix en Provence (FR); Paola Demartini, Colomiers (FR); Lorenzo Ricotti, Colomiers (FR)

( * ) Notice: Subject to any disclaimer, the term of this patent is extended or adjusted under 35 U.S.C. 154(b) by 0 days.

(21) Appl. No.: 16/300,922

(22) PCT Filed: May 15, 2017

(86) PCT No.: PCT/IB2017/052859
§ 371 (c)(1),
(2) Date: Nov. 12, 2018

(87) PCT Pub. No.: WO2017/199159
PCT Pub. Date: Nov. 23, 2017

(65) Prior Publication Data
US 2019/0162163 A1 May 30, 2019

(30) Foreign Application Priority Data

May 18, 2016 (IT) .......................... 102016000051016

(51) Int. Cl.
*F03B 17/06* (2006.01)
*H02K 7/18* (2006.01)
*H02K 35/04* (2006.01)

(52) U.S. Cl.
CPC ........... *F03B 17/06* (2013.01); *H02K 7/1892* (2013.01); *H02K 35/04* (2013.01); *Y02E 10/28* (2013.01)

(58) Field of Classification Search
USPC .............. 290/1 R, 54; 310/330–339; 416/81; 60/327, 497
See application file for complete search history.

(56) References Cited

U.S. PATENT DOCUMENTS 4,387,318 A * 6/1983 Kolm .................... F03B 13/141
310/330
4,461,968 A * 7/1984 Kolm .................... H01H 57/00
200/181

(Continued)

FOREIGN PATENT DOCUMENTS

JP 2003116258 4/2003

*Primary Examiner* — Pedro J Cuevas
(74) *Attorney, Agent, or Firm* — Themis Law

(57) ABSTRACT

A device transducing fluid dynamic energy into electrical energy, usable as a flow meter or energy harvester, includes a mechanical interaction element with a fluid flow, which is brought into oscillation or vibration by the fluid flow, by way of one or more elastic suspension elements; a magnetic induction electromotive force generator, dynamically connected to the mechanical interaction element by the fluid flow, which crosses an electric conductor, moved in the magnetic field by the oscillating or vibrating motion of the mechanical interaction element, thus generating an induced current in the conductor; and a collection unit for the electrical signal generated by induction. The mechanical interaction element is suspended to oscillate around an axis transversal to the flow direction and corresponding to a transversal axis half way along the mechanical interaction element.

19 Claims, 8 Drawing Sheets

(56) References Cited

U.S. PATENT DOCUMENTS

| | | | | |
|---|---|---|---|---|
| 4,536,674 A * | | 8/1985 | Schmidt | F03D 5/00 310/330 |
| 5,223,763 A * | | 6/1993 | Chang | H02N 2/185 310/339 |
| 6,273,680 B1 * | | 8/2001 | Arnold | F03B 17/00 416/1 |
| 6,424,079 B1 * | | 7/2002 | Carroll | H02N 2/185 310/339 |
| 7,199,480 B2 * | | 4/2007 | Fripp | E21B 41/0085 290/1 R |
| 7,208,845 B2 * | | 4/2007 | Masters | H02K 7/1892 290/1 R |
| 7,224,077 B2 * | | 5/2007 | Allen | F03D 5/00 290/1 R |
| 7,493,759 B2 * | | 2/2009 | Bernitsas | F03B 17/06 60/497 |
| 7,569,952 B1 | | 8/2009 | Bono | |
| 7,573,143 B2 * | | 8/2009 | Frayne | F03B 17/06 290/1 R |
| 7,626,281 B2 * | | 12/2009 | Kawai | F03D 5/06 290/1 R |
| 7,772,712 B2 * | | 8/2010 | Frayne | F03B 5/00 290/1 R |
| 7,821,144 B2 * | | 10/2010 | Frayne | F03B 17/06 290/1 R |
| 7,986,051 B2 * | | 7/2011 | Frayne | F03B 17/06 290/1 E |
| 8,026,619 B2 * | | 9/2011 | Frayne | F03B 17/06 290/1 R |
| 8,047,232 B2 * | | 11/2011 | Bernitsas | F03B 17/06 137/808 |
| 8,102,072 B2 * | | 1/2012 | Tsou | F03D 5/00 290/55 |
| 8,142,154 B2 * | | 3/2012 | Gartner | F03B 5/00 416/132 A |
| 8,272,839 B2 * | | 9/2012 | Gartner | F03B 17/00 416/132 A |
| 8,432,049 B2 * | | 4/2013 | Jung | F03B 13/262 290/43 |
| 8,432,057 B2 * | | 4/2013 | Filardo | F03B 13/188 290/54 |
| 8,519,554 B2 * | | 8/2013 | Kaplan | F03B 17/06 290/1 R |
| 8,638,002 B2 * | | 1/2014 | Lu | F03D 5/00 290/1 R |
| 8,786,113 B2 * | | 7/2014 | Tinnen | E21B 41/0085 290/1 R |
| 8,981,586 B2 * | | 3/2015 | Rodney | E21B 41/0085 290/54 |
| 8,985,967 B2 * | | 3/2015 | Gudivada | F04D 13/043 415/1 |
| 9,006,919 B2 * | | 4/2015 | Lynch | F03B 17/06 290/54 |
| 9,222,465 B2 * | | 12/2015 | Thorp | F03D 5/00 |
| 9,447,774 B2 * | | 9/2016 | Olsen | F03D 5/00 |
| 9,683,538 B2 * | | 6/2017 | Drevet | F03D 13/20 |
| 9,841,000 B2 * | | 12/2017 | Greenblatt | F03B 5/00 |
| 9,879,647 B2 * | | 1/2018 | Drevet | F03B 13/188 |
| 10,287,854 B2 * | | 5/2019 | Jaaskelainen | E21B 47/16 |
| 10,367,434 B2 * | | 7/2019 | Ahmad | H01L 41/125 |
| 2008/0048455 A1 * | | 2/2008 | Carney | F03D 5/00 290/54 |
| 2008/0129254 A1 * | | 6/2008 | Frayne | F03B 17/06 322/3 |
| 2008/0295509 A1 * | | 12/2008 | Bernitsas | F03B 17/06 60/497 |
| 2009/0114002 A1 * | | 5/2009 | Bernitsas | F15D 1/12 73/105 |
| 2009/0250129 A1 * | | 10/2009 | Bernitsas | F03B 17/06 137/808 |
| 2011/0049901 A1 * | | 3/2011 | Tinnen | E21B 41/0085 290/54 |
| 2011/0084489 A1 | | 4/2011 | Kaplan | |
| 2013/0020806 A1 * | | 1/2013 | Hsu | F03G 7/08 290/54 |
| 2013/0214532 A1 * | | 8/2013 | Hsu | F03G 7/08 290/43 |
| 2013/0227940 A1 * | | 9/2013 | Greenblatt | F03B 5/00 60/327 |
| 2013/0328316 A1 * | | 12/2013 | Rodney | E21B 41/0085 290/54 |
| 2014/0062090 A1 | | 3/2014 | Duvra | |

* cited by examiner

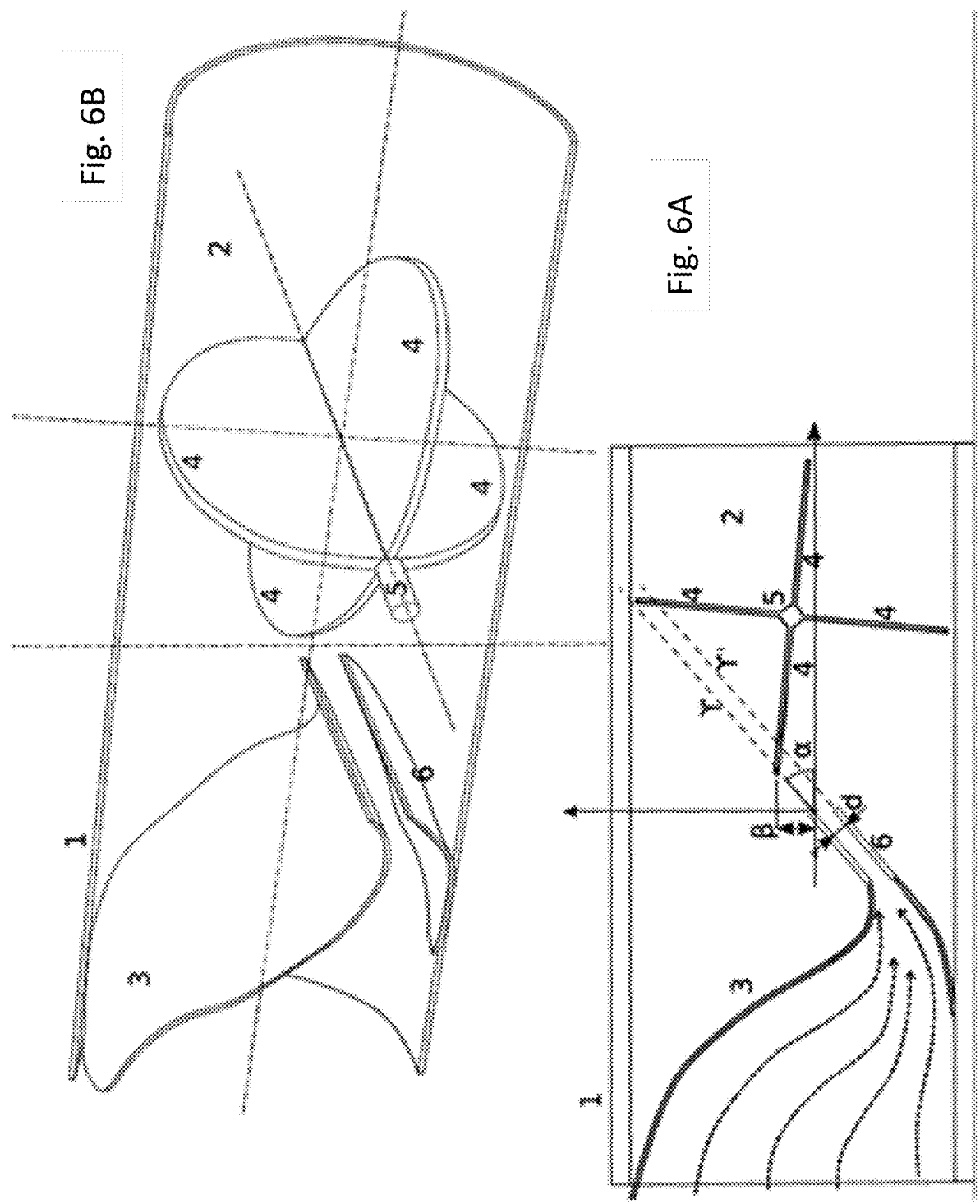

OSCILLATING DEVICE FOR CONVERTING FLUID KINETIC ENERGY INTO ELECTRICAL ENERGY

The invention is a fluid dynamic energy to electromotive energy transducer device, based on:

a mechanical interaction element with a fluid flow, supported in an oscillating way at least in a plane with a component parallel to the flow direction and a component preferably orthogonal to a surface of the mechanically interacting element itself which is transversal to the flow direction; the element is brought into oscillation or vibration by the fluid flow, by means of one or more elastic suspending element;

a magnetic induction electromotive force generator, including at least a preferably non homogeneous magnetic flow generator, the flow crossing at least an electric conductor preferably in the form of at least a coil;

the conductor or coil is dynamically connected to the element mechanically interacting with the fluid and it is moved across the magnetic field by the oscillating or vibrating motion of the element, thus experiencing an induced current;

at least one collection unit for the electrical signal generated by induction in the mentioned conductor or coil, electrically connected to the ends of the coil itself.

This principle is commonly used to realise "non-rotating" aeolian generators, using a technique to extract energy from a moving fluid, either a gas (e.g. air, fuels gas, etc.) or a liquid (water, fuel, etc.) by electro-mechanical conversion in a magnetic field: a part of the kinetic energy of the fluid is used to generate a relative motion between a magnetic field and some coils made up of conductive wire.

In order to generate a variation of the magnetic field through the coil surfaces, all relative combination are possible:

fixed coils with a moving magnetic field,
moving coils in a fixed magnetic field,
both coils and magnetic fields moving, both coils and magnetic fields relatively moving one with respect to the other,
the magnetic field changing intensity and/or direction of the lines.

In all the described systems the concatenated magnetic field B, getting through the coils surface, induces an electric alternating current (AC) in the coils' wire, according to the well-established Maxwell's equations, thus converting a part of the energy of the fluid into electric energy.

An alternative to rotating parts systems is based on the study of fluttering surfaces (a.k.a. "wings"). These wings enable the energy harvesting at lower fluid speeds with respect to those needed for an effective use of the rotating conversion systems and offer a simpler constructive approach, resulting in lower cost and increased long-term reliability.

As these transducers are easy to build and can be very small in size, they are ideal to generate the energy to support remote units which remain in stand-by mode for most of the time and in working mode for short periods separated by long time intervals.

In the Internet of Thing (IoT) domain, the fluid energy can be collected (harvested) to become an alternative source of power for microelectronic-based remote systems. Such systems are mostly remote sensors or meteorology systems, intended to spend most of their time in stand-by mode and to operate with the minimum of energy.

An efficient and compact tool able to harvest a fluid's energy can therefore contribute to an IoT node power demand, by integrating or even by replacing the battery. That would result into highly reduced needs of long-term maintenance operation and high system reliability.

There is therefore a pressing need to improve the existing devices to allow always better performances, reliability and duration.

The goal of this invention is to improve the effectiveness of the above described kind of devices, specifically targeting IoT applications to make it more effective, more reliable and cheaper.

A first improvement is a realisation of the device which can be suitable for bidirectional fluid flows, with no need to reposition the device if the direction of the flow changes.

A second goal of this invention is to optimise the fluid-dynamic interaction between wing and fluid, by means of ameliorating both the floating structure and the elastic suspensions.

As the generated electrical signal depends both on the amplitude and on the frequency of the oscillation, the invention focuses on particularly maximizing the amplitude of the oscillations to enhance efficiency with low density and or low speed flows with little kinetic energy.

Another embodiment of the invention is the optimisation of a device which can be suitable for bidirectional fluid flows, with a simple and robust structure, thus avoiding architectural compromises which could limit the efficiency by reducing the freedom of the oscillating motion of the interfering element.

According to the above, the invention is a fluid dynamic energy into electrical energy transducer device, including:

a mechanical interaction element with a fluid flow, supported in an oscillating way at least in a plane with a component parallel to the flow direction and a component preferably orthogonal to a surface of the mechanically interacting element itself which is transversal to the flow direction; the element is brought into oscillation or vibration by the fluid flow, by means of one or more elastic suspending element;

a magnetic induction electromotive force generator, including at least a preferably non-homogeneous magnetic flow generator, the flow crossing at least an electric conductor preferably in the form of at least a coil;

the conductor or coil is dynamically connected to the element mechanically interacting with the fluid and it is moved across the magnetic field by the oscillating or vibrating motion of the element, thus experiencing an induced current;

at least one collection unit for the electrical signal generated by induction in the mentioned conductor or coil, electrically connected to the ends of the coil itself;

the mechanically interacting element is suspended oscillating around an axis transversal to the flow direction and corresponding to a transversal axis half way along the element itself a frame supports the rotation axis at its ends elastic means are included in the direction of rotation, with respect to the rotation around the axis.

the rotation axis is preferably a central axis in the projection of the shape of the interaction element on the cross-section plane of the fluid flow and it corresponds to the central diametrical axis on the transversal section of the fluid.

In an embodiment, the elastic means acting on the rotation of the axis are helicoidal springs The helicoidal coils are preferably connected with each of the ends of the oscillating axis of the element interacting with the fluid flow either where it is suspended to the frame or in a position half way between the frame support and the element interacting with the fluid.

In this way, the interacting element can oscillate against an elastic force which tends to reset its rest position with a pre-set orientation or angular position of the element with respect to the fluid flow, referring to the mentioned oscillation.

In an advantageous embodiment, the component which mechanically interacts with the fluid flow comes in the shape of a leaf, a foil, a wing or any other similar shape with an aerial projection corresponding to the transversal section of the fluid flow when enclosed in a duct, channel or pipe, as well as matching part of it when the flow is not restrained (e.g. in case of wind, tide, stream, etc.).

According to another embodiment the induction coil or coils are spirals of conductive material fixed, laid on, or embedded in the fluttering element surface.

In this case a stationary magnetic field, homogeneous in intensity and with a fixed direction and verse is suitable.

An orientation of the magnetic field can be orthogonal both to the oscillation axis of the element mechanically interacting with the fluid and to the flow direction of the fluid.

According to an improvement, the coil is electrically connected with the ends of the oscillating axle, departing from diametrically opposed sides of the interaction element, the ends being of electrically conductive material and connecting the mentioned coil on one side with the unit collecting the electrical signal generated by induction.

In an embodiment, the device of this invention is mounted inside a pipe or a restraining duct of the fluid flow, between two flow conveyors which, according to the flow direction, generate different densities of the fluid flow along the section of the duct (or pipe).

Such kind of non-homogeneous flow generate higher density of the fluid flow radially farther from rotation axis of the mechanically interacting element (wing or fluttering surface) of the device.

The mentioned conveyors generate a higher density of the flow towards one of the two opposite sides of the fluid flow section as well as of the pipe or duct sections which are diametrically opposed with respect to the element interacting with the fluid flow. The sections are farther away from the oscillation axis, thus increasing the action of the flow towards such radially zones which are closer to the rotation axis of the interacting element.

Such conveyors have an "S" shaped transversal section.

According to another variation, the device can be improved to be also used with low density and or low speed flows with little kinetic energy.

With the oscillating surface, in presence of a magnetic field, part of the oscillating energy is transformed into electrical energy. The characteristics of the generated electrical signal can be measured as current or voltage value and depend fro two factors:

1. The amplitude of the oscillations of the coil: the bigger the amplitude of the oscillation, the higher peaks of voltage or current 2. The frequency of the oscillations: the higher the frequency, the more energy transferred.

With low speed flows, the amplitude of the oscillations becomes the dominant factor for the extraction of the energy.

The impact of the fluid on the interacting element generates an oscillation of the coil in the magnetic field which can have either a regular or a chaotic motion. According to the energy conservation laws, the extraction of the electrical energy from the coil reduces the amplitude and lowers the frequency of the oscillations below a threshold at which the collected energy is drastically reduced or zero. In these conditions, the flowing surface-coil system enters a steady state in which, averagely, the generated power either vanishes or is too little to be collected.

To avoid the above mentioned conditions, the invention the device offers a particular energy collecting method, controlled by a unit which is associated to or integrated in the collecting unit. The mentioned control unit can automatically interrupt the coil induced current extraction, to avoid damping or termination of the oscillations.

The block of the energy extraction in a particular moment is converted in the removal of a temporary motion constraint and allows to re-enable the interacting element to move with big amplitudes, thus restarting the energy extraction process.

An electrical energy evaluation parameter can be set in the control unit, with minimum voltage or current value threshold for the electrical signal induced in the coils, while the control unit measures the effective voltage or current of the induced electrical signal, thus interrupting the coil induced current extraction for a pre-set time interval, when the measured respective voltage or current reaches the minimum threshold value or descends below it.

According to an embodiment, the minimum threshold of voltage or current value is defined as an intermediate value between a theoretical ideal current or voltage value of the induced signal in the coil due to the oscillations of the wing and a current or voltage value corresponding to the condition in which the energy extraction damps the amplitude and/or the frequency of the wing oscillations to an extent to reduce close to zero the energy that can be extracted; this value can possibly be defined empirically, experimentally or by theoretical computations.

An embodiment includes a fluid dynamic energy into electrical energy transducer device based on:

a mechanical interaction element with a fluid flow, supported in an oscillating way and which is brought into oscillation or vibration by interfering with the fluid flow, by means of one or more elastic suspending element;

a magnetic induction electromotive force generator, including at least a preferably non-homogeneous magnetic flow generator, the flow crossing at least an electric conductor preferably in the form of at least a coil;

the conductor or coil is dynamically connected to the element mechanically interacting with the fluid and it is moved across the magnetic field by the oscillating or vibrating motion of the element, thus experiencing an induced current;

at least one collection unit for the electrical signal generated by induction in the mentioned conductor or coil, electrically connected to the ends of the coil itself the electrical connection is realised by at least part of the suspending elastic elements, which are made of electrically conductive material, and connect the conductor and/or coil with the collecting unit for the induction generated electrical signal;

the control unit includes or is associated to a control section with a memory where at least a minimum threshold of voltage or current value of the electrical signal extracted from the generator can be set;

a measure unit for the electrical signal collected from the generator;

a signal comparator to compare the measured voltage or current value against the set threshold value;

a cutter of the electrical connection between the signal generator and the signal collecting unit, driven by the mentioned collecting unit, which cuts off the connection when the voltage or current value is equal or less than the set threshold voltage.

According to another feature, the control unit includes a timer to set the time length during which the electrical connection between signal generator and collecting unit remains cut and after which the cutting switch automatically closes again the connection between generator and collecting unit.

In another improvement, many different threshold values may be stored in the control unit memory, they can be either computed or empirically determined; in the latter case, resulting from experiments in different working conditions with respect to the type of fluid, the environment, flow rate, different cut off time lengths.

The invention includes also a method for the conversion of the fluid dynamic energy into electrical energy, based on the following steps:

a) a floating surface or an oscillating wing is exposed to a fluid flow in such a way that it is brought into an oscillating condition;

b) associate to it a magnetic induction based electromotive force generator, including at least a magnetic flux source, with the flux preferably non-homogeneous, crossing at least an electrical conductor preferably in the form of at least a coil, which is dynamically connected to the wing or floating surface;

c) extract and collect or use the electrical signal induced in the generator;

d) determine a voltage or current critical value for the generated electrical signal at which the electrical energy collection is no more efficient and damps or reduces to zero the oscillating motion of the floating surface or wing;

e) set a minimum threshold of voltage or current value above the critical value at which the oscillation damping is partial to a defined extent;

f) measure the voltage or current value of the generated signal;

g) compare the measured value with the minimum threshold value and interrupt the generated signal extraction for a pre-set time when the measured value equals or is less than the minimum threshold;

h) reactivate the signal extraction after the pre-set time and repeat the steps a) to h) in a loop.

All the aforementioned characteristics can be applied to any of the embodiments described above, according to the features of the invention and in any subset of them.

When the transducer device in any of the described combinations must be placed inside a duct or a pipe or any other means of flow restraining, there may arise problems to transfer the electrical signal outside the item containing the fluid. The situation can be critical when the physical and or chemical characteristics of the fluid require special security measures. Holes or openings in the duct (pipe, or similar restraining items) need maintenance and could be damaged, causing fluid leakages.

According to a further feature, this invention defines a device according one or more of the aforementioned variations and embodiments such that when used inside flow ducts it can guarantee an effective transfer of the electrical energy generated inside the means of restraint of the fluid to the outside without any piercing intervention on the walls of the duct or conductors passing through them.

This invention envisages in this case a fluid dynamic energy to electromotive energy transducer device, based on:

a mechanical interaction element with a fluid flow, supported in an oscillating way and which is brought into oscillation or vibration by interfering with the fluid flow, by means of one or more elastic suspending element;

a magnetic induction electromotive force generator, including at least a preferably non-homogeneous magnetic flow generator, the flow crossing at least an electric conductor preferably in the form of at least a coil;

the conductor or coil is dynamically connected to the element mechanically interacting with the fluid and it is moved across the magnetic field by the oscillating or vibrating motion of the element, thus experiencing an induced current;

at least one collection unit for the electrical signal generated by induction in the mentioned conductor or coil, electrically connected to the ends of the coil itself, while the device is set inside the fluid flow container, the collecting unit is placed outside it, the electrical electricity transfer from the coil to the collecting unit across the walls of the duct takes place by means of capacitive coupling between a terminal, connected to the coil inside the fluid and an external terminal connected to the collection unit, in this configuration, the two terminals act as the two electrodes of a capacitor and being the wall of the container the dielectric.

Being the electrical signal an AC signal, the capacitor guarantees that it crosses the wall of the container, being the capacitor transparent to his kind of signal.

If the wall is metallic and conductive, then the device can be mounted on a tubular joint to be inserted in the duct, joining two adjacent sections of the duct itself. The is at least partially made of dielectric, in the region acting as capacitor electrodes: the terminals connected to the coil and to the collecting unit.

As an alternative a window of dielectric material can be embedded in the part of the restraining du in the area of the above-mentioned terminals connected to the coil and the collecting unit, which represent the capacitor electrodes.

According to a further common feature of all the above described embodiments, the device structure has a rigid tubular frame inside which the element mechanically interacting with the fluid is elastically oscillating supported, including the induction coils generating the electromotive force, a magnetic field generator housed inside a duct restraining the fluid, either inside the duct or in a tubular joint inserted between two sections of the duct and a signal collecting unit connected to the coil and eventually a control unit outside the duct or on a supporting frame which can be fastened outside the duct as the electrical energy can pass from the coil through the wall of the duct to the collection and or control unit.

The device, according one or more of the above described variations is used to measure the flow rate of a fluid flow.

According to another feature, the device according one or more of the above described embodiments can be used as mechanical into electrical energy converter to accumulate the latter, for example as energy generator or harvester.

In all the described embodiments, the electrical signal induced in the coil is extracted from the coil through the electrically conductive supporting elements connected to the coils ends. The electrical conduction of the signal can also take place through the springs, small shafts or the pivots supporting the wing.

An executive variation of the above embodiments, possible in any combination with one or more of the characteristics above described in the mentioned variations, envisages the element mechanically interacting with the fluid flow to be suspended rotationally around a rotation axis the orientation of which has at least a directional component transversal to the fluid flow direction.

In this case, the interacting element acts as whirl in a fluid flow.

According to an embodiment, the interacting element can have two wings stretching in opposite directions with respect to the intermediate rotation axis and which in a preferred embodiment are coplanar.

In a further executive variation the element interacting with the fluid may include three or more wings, radially extending outwards departing from a common rotation axis.

An advantageous embodiment envisages at least a fluid flow conveyor in combination with the whirl interacting element, the conveyor including at least a transversal section which shrinks like a funnel and ending with an exit duct, the ideal extension of which is oriented with a predefined angle with respect to a wing parallel to the flow direction and intersecting the radially external end border of the wing referring to rotation axis.

According to another executive variation, which can be envisaged separately or in combination with the previous claims, at least one or more wings bear at least a coil, formed by one or more turns, being the rotation axis given by two conductive material terminals, connected one to the other by an intermediate segment of non-conductive material, being each of the coil ends connected respectively to one of the two conductive ends of the rotation axis.

From the above description the advantages of the invention are clearly in evidence.

Further improvements are subjects of the sub-claims.

The characteristics described above in the different combinations and sub-combinations, together with other characteristics, as well as the related advantages are described in some executive examples, depicted in the attached drawings where:

FIGS. 6A and 6B show a variation of FIG. 5 where the fluid flow on the interacting element is conveyed along a direction tilted with respect to the direction of the fluid in the duct where the mentioned interacting element is mounted.

It is named equivalently "wing", "fluttering surface", "leaf", "foil" when it is a flat element with any aerial projection shape, showing similar behaviour in a fluid.

Figure 1:
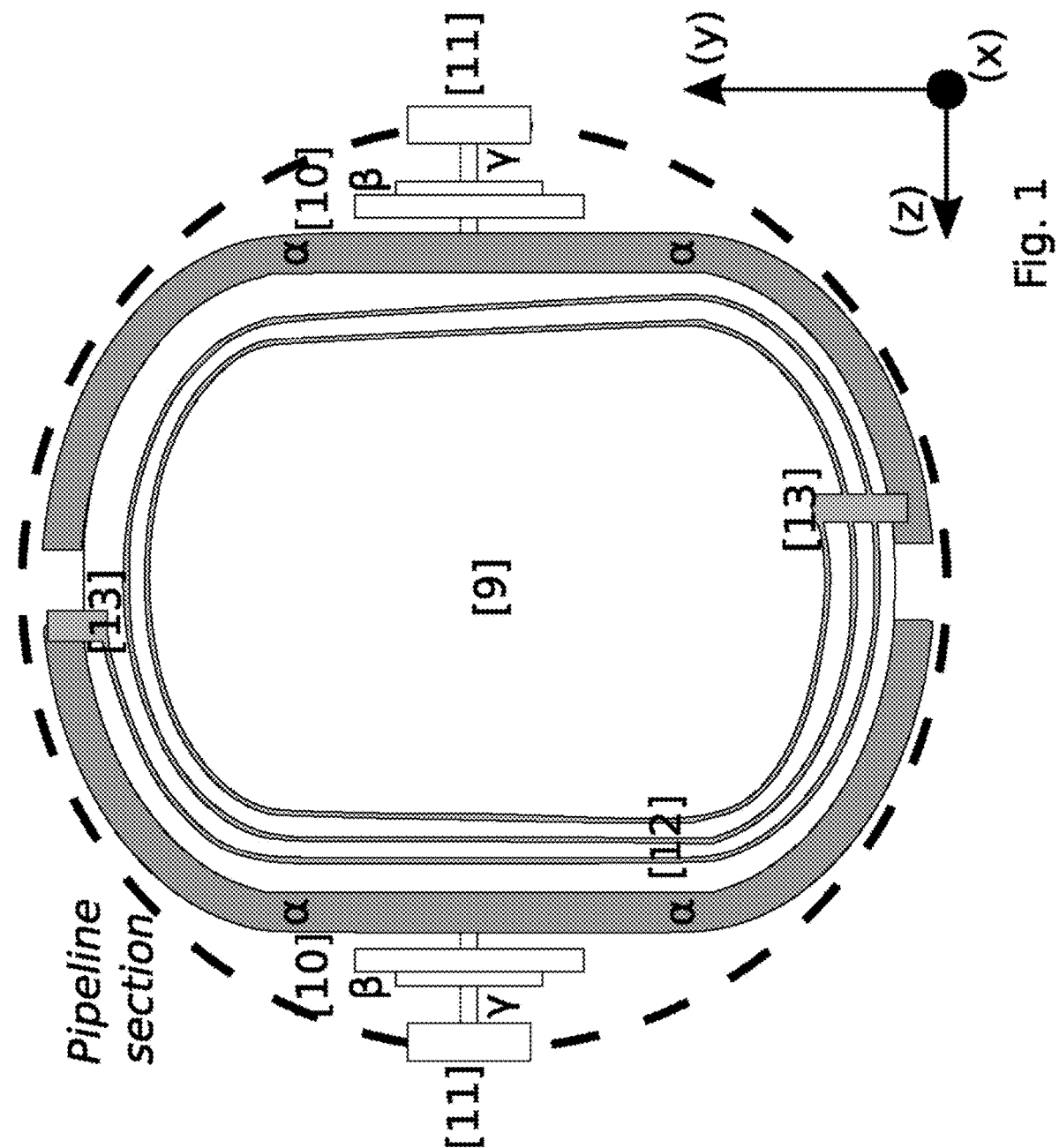
FIGS. 1 and 2 show an embodiment respectively. Transversal to the fluid flow and in perspective.
Figure 2:
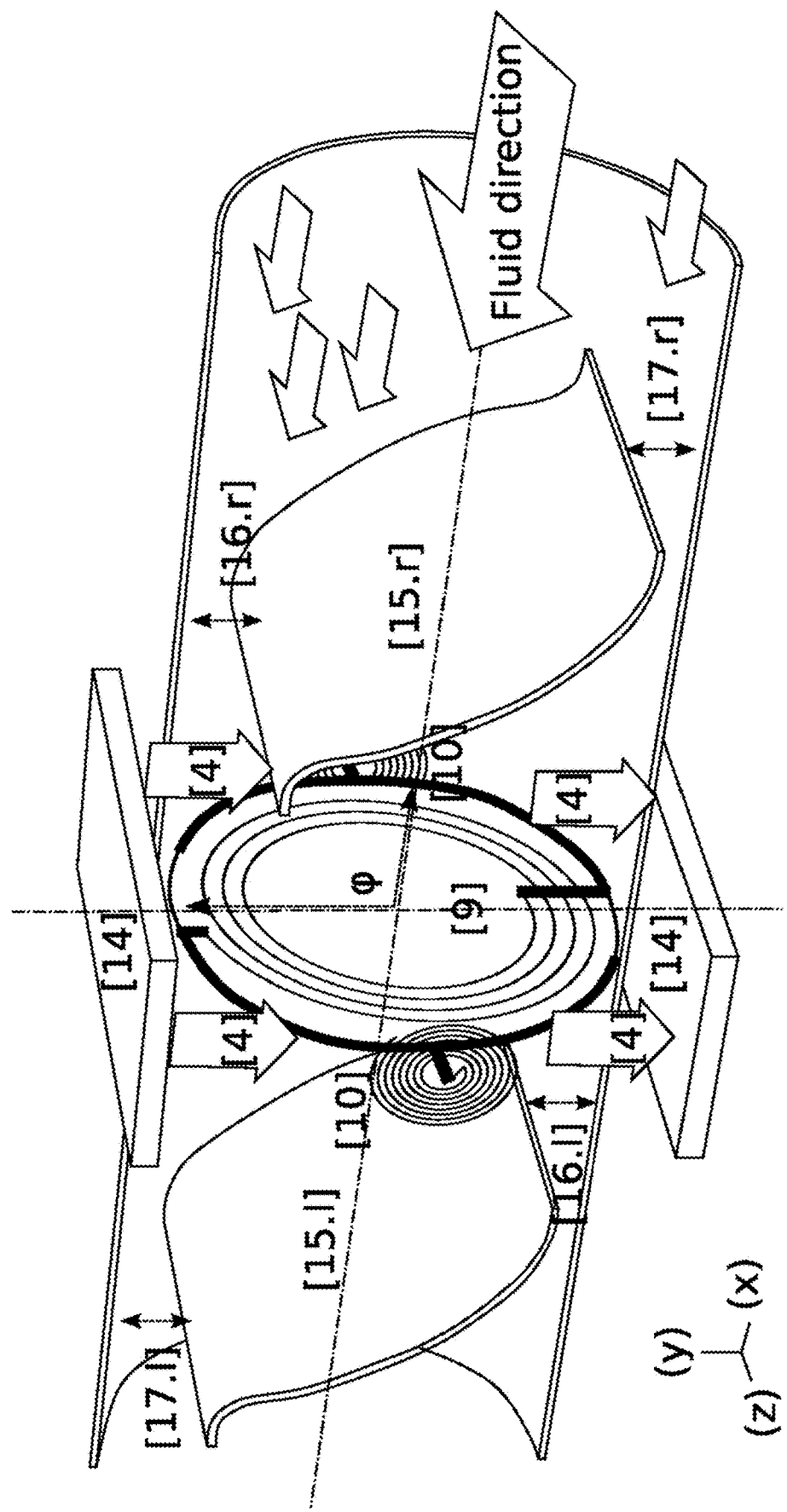

FIGS. 1 and 2 show an embodiment respectively. along the fluid flow and in perspective.

The described embodiments, even if effective with normal or middle-low flow rates, can face drawbacks when inserted is small pipes:

a) the whole transversal section of the fluid flow is not leveraged the complete transversal section, but only the part of it corresponding to the projection of the interacting element on the transversal section itself b) The elastic suspending elements of the element interacting with the fluid flow do not suppress completely the possibility of oscillations in direction of the fluid flow (axis z in the pictures). It is therefore necessary to carefully dimension the device, in order to avoid collisions with the internal surface of the duct. This limits the oscillations amplitude and effectiveness in the energy harvesting.

c) In case of ducts where the fluid can flow in both directions, it is complicated to use common devices without compromising the energy conversion efficiency.

The embodiment of FIGS. 1 and 2 overcomes these limitations with an interacting element of type butterfly, like the butterfly valves.

In this embodiment the element interacting with the fluid is built similarly to bolt [9] of a butterfly valve where the conductive tracks forming the coil are integrated, embedded or fixed, which is inside a constant and partially uniform magnetic field.

FIG. 1 shows an aerial view in the flow direction of a device with an interacting organ such as the above described.

The interaction organ [9] is inserted in a duct (drawn as dash line) which can be of the same size as the pipe where the fluid flows and can be inserted as a joint between two sections of the pipe itself. As an alternative, having a tubular frame, it can be inserted in the duct and blocked in a predetermined position.

The two small shafts [10] are two oscillation axes coaxially oriented between them and fastened to the frame by two stationary fastening terminals [11].

Each shaft [10] is made of three segments, with the following purposes:

Section $\alpha$ of the two small shafts [10] forms or surrounds an outlying part of the rim of the leaf, foil, or wing [9] which is almost completely enclosed, peripherally by the $\alpha$ sections of the two diametrically opposed shafts.

The shape of the part of coil [9] which is the mechanically interacting element corresponds to the section of the pipe in which it is accommodated and comprises two diametrically opposed flattened zones to house the shafts.

Section $\beta$ of the shafts [10] shows a section of an axle which is coaxial with the small axle of the other diametrical opposed shaft. Both axle sections are coaxial with an oscillation axis of the interaction element [9], coincident with a diametrical axis of the pipe section and the central axis of the interaction element [9]. The axle connects section $\alpha$ with a spiral coil.

Section $\gamma$ is another axle section, coaxial to the $\beta$ section axle and rigidly connects the spiral spring to the anchoring points [11].

The coil ends [12] are connected to the shafts [10] by means of bridges [13] which guarantee direct or indirect electromagnetic connection between the coil and the shafts themselves.

The shafts [10] or at least some segments of them are of conductive material and are used to extract electrical energy from the coil towards the outside, as will be described in an embodiment below, the ends of the shafts can connect to electrical signal extraction conductors which can reach the outside of the fluid restraining duct through tight passages, else the electrical signal is transferred from the shafts [10] to external conductors by capacitive coupling.

As shown in FIG. 2 the interacting element of FIG. 1 is connected to flow conveyors on both sides of the element itself The conveyors [15.1] and [15.r] are shaped in a way to create an asymmetry in the flow of the fluid impinging on the interaction element, to force most of the fluid towards one of the ends of the interacting element [9] which is radially most far away from the oscillations axis.

In this way the flow is concentrated in the part of the pipe corresponding to one of the two half-sections resulting from a cut of the circular section along a diameter.

In the particular embodiment depicted in FIG. 2, the section of the flow conveyor [15.r] along the axial diametrical plane has an "S" shape: the central part is a sloping surface deviating the flow, while the curved ends deflect in direction of the flow, creating passage windows at diametrically opposed ends [16.r] and [17.r].

For a flow coming from the right, the shape of the conveyor [15.r] deflects most of the low to pass through the opening [16.r], while only a smaller part flows through the opening [17.r]. This creates a difference in speed and impulse (pressure) of the fluid flow impinging on the upper part on the right side of the interacting element [9], with respect to the flow impinging on the lower part.

As a result, the butterfly interacting element will be pushed to rotate counter-clockwise around the z axis and the φ angle changes from 90 deg to lower values. As the spiral springs of the □ section of the shafts [10] are charged, the rotation will result into variable angular oscillations.

The magnetic field [4] is constant and spatially homogeneous and it is generated by the magnetic dipoles [14], the φ induce a current in the turns of the planar coil [12].

Another conveyor [15.1] is placed on the other side of the interaction element [9], at the same distance, with the same shape and the same orientation of the shape with respect to the fluid flow direction or the pipe axis as the former conveyor [15.r].

It is evident that in case of the fluid coming from the opposite direction, the flow is deflected making the most of it pass the opening [16.1], generating higher pressure on the lower left part of the interacting element [9]. Thus, the interacting element [9] starts oscillating counter-clockwise for exactly the same mechanism described for the conveyor [15.r], making the device suitable for bidirectional flows.

Figure 3:
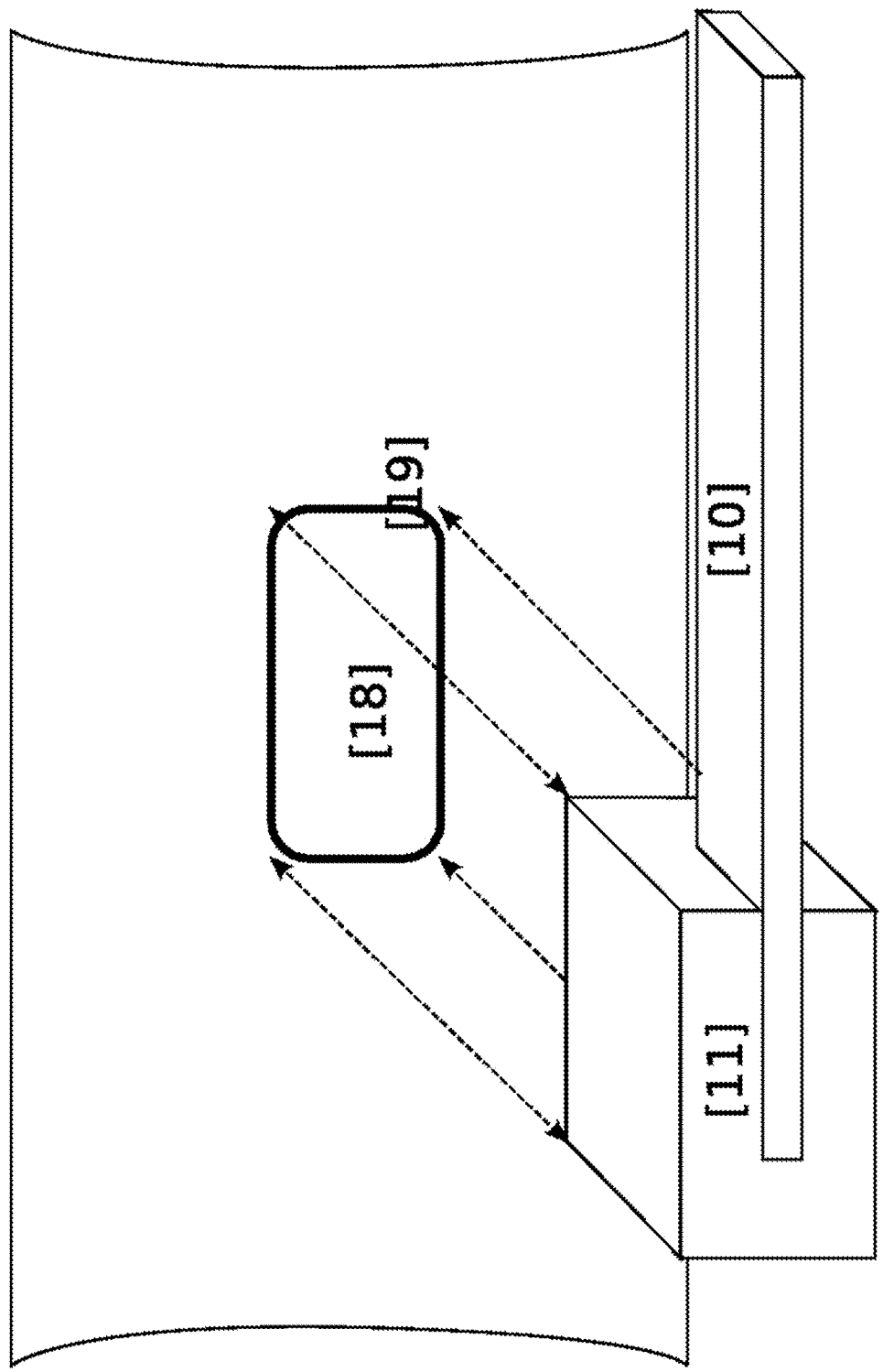
FIGS. 3 and 4 show a detail of a capacitive system to transfer the electrical signal across the pipe wall, respectively, with a section view, along a diametrical plane, an axial plane and a detail of a transversal section of the pipe.
Figure 4:
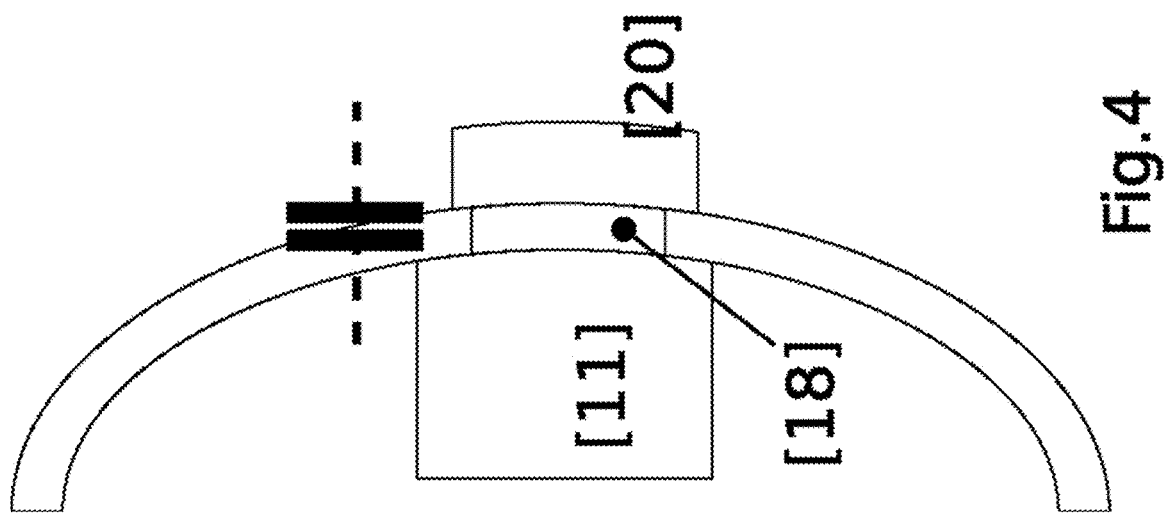

FIGS. 3 and 4 show a detail of an electrical signal transfer capacitive system across a wall of the pipe, respectively with a diametrical section, axial section and a detail on the transversal section of the pipe.

The device of the invention can be used as flow meter to measure the flow of fluid in ducts which convey dangerous liquids for which technical security standards or law demands often strict tests of tight duct walls crossings.

The need to transfer outside the energy produced inside the ducts, for example for inside a pipeline to the exterior, must be law and standard compliant.

For all the above described embodiments it is possible to extract the collected electrical energy, both to measure the flow rate and to collect electrical energy just extracting the induced current in a wire passing through a hole in the pipe. Nevertheless there are many cases in which this solution is not acceptable.

In the embodiment of FIGS. 3 and 4 the electrical energy transfer through the pipe's (or duct's) wall is based on the induced current being alternate: it can be transferred by a capacitive coupling.

In FIG. 3, a dielectric window is embedded in the wall. In this particular embodiment, the dielectric window [18] is tightly fastened to the wall by a frame [19].

In a different realisation, the window [18] can be extended to become a section of the whole pipe and the frame [19] can become the link between this section and the rest of the pipe.

The terminal [11] in electrical contact with the coil generating electrical current through the shaft [10] is set in correspondence with the dielectric window [18].

The terminal [11] is fastened to the pipe wall in correspondence of the dielectric window and it is therefore electrically insulated from the pipe wall, while the dielectric material works as the internal plate of a capacitor. The other electrode of the capacitor [20] is outside the pipe wall, in correspondence of the dielectric window. As depicted in FIG. 4, the dielectric window terminal and the external terminal form a capacitor [11]+[18]+[20].

Alternated current peaks cross the capacitor and the electrical signal can be collected form the external electrode [20] and transmitted to the collecting unit and/or the driving electronics.

According to another feature, for any of the different realisations of the present invention, together with the described device an electronic control unit is present, executing an optimization algorithm for the electrical energy extraction, to prevent a hindrance to the movement of the interacting element.

In presence of a magnetic field, thanks to the interacting element with the fluid flow, part of its oscillating energy is transformed into electrical energy. The characteristics of the generated electrical signal can be measured as current or voltage value and depend from two factors:

1. The amplitude of the oscillations of the coil: the bigger the amplitude of the oscillation, the higher peaks of voltage or current
2. The frequency of the oscillations: the higher the frequency, the more energy transferred.

With low speed flows, the amplitude of the oscillations becomes the dominant factor for the extraction of the energy.

The impact of the fluid on the interacting element generates an oscillation of the coil in the magnetic field which can have either a regular or a chaotic motion. According to the energy conservation laws, the extraction of the electrical energy from the coil reduces the amplitude and lowers the frequency of the oscillations below a threshold at which the collected energy is drastically reduced or zero.

In these conditions, the system enters a steady state in which, averagely, the generated power either vanishes or is too little to be effectively collected.

According to this invention the device includes an electronic control unit capable to execute a control cycle aiming to automatically interrupt the coil induced current extraction, to avoid damping or termination of the oscillations. The block of the energy extraction in a particular moment is converted in the removal of a temporary motion constraint and allows to re-enable the interacting element to move with big amplitudes, thus restarting the energy extraction process.

In a realisation using the current value as a measure of the induced electrical energy, the algorithm of the control unit implements a cycle with the following steps:

a) Be I0 the current at the input of the control electronic circuit [5] such that the system downstream is incapable to extract any energy from the coil.

b) Be IOpt an optimized value of the current spikes at the input of the control electronic circuit, such that IOpt>>I0 and corresponding to the surface oscillating at optimized conditions for energy extraction.

c) Be Imin, with IOpt>Imin>I0 a value of the current spikes at the input of the control electronic circuit such that, when the spikes become consistently small with respect of |Imin| in absolute value, it can be assumed that the energy extraction is chocking the oscillations.

d) The electronic controller will monitor the current spikes from the coil and electrically connect the coil to the harvesting electronic for energy extraction only when the first spike is higher than |IOpt| in absolute value.

e) As an effect of the current extraction, the current spikes will eventually drop below |IOpt|. The extraction will continue up to the moment when the spikes are smaller than for a pre-defined control time tCNTRL.

f) When the latter condition is met, the control electronics will interrupt the energy extraction and wait for the condition (d) to be true again As a consequence, the energy is extracted by the coil in a non-continuous ("syncopated") approach, resulting more effective in self-adapting to the surface oscillation dynamics and to the variation of the incoming flow.

This invention also covers the possibility to implement the described algorithm by monitoring the current spikes as voltage drops through a resistance or the charge variation on a capacitor. In this case, the defined current spikes become voltage spikes or accumulated change rates.

For this application of the invention, the control electronics must know the pre-set values of IOpt, Imin and I0 (or VOpt, Vmin and V0, in the case of Voltage control).

All these parameters depend on the particular implementation of the energy harvester, its characteristics and those of the fluid.

So it is required to the control electronic to be able to use a convenient piece of hardware like (but not limited to) a Non-Volatile Memory, where the values of IOpt, Imin and J0 (or Vopt, Vmin and V0, in case of different usage conditions, system configuration, kind of fluid and flow conditions) can be stored to be available for the control unit.

At start-up the device will use the best set of parameters IOpt, Imin and I0 (or Vopt, Vmin and V0, in case of voltage control) for optimized operation, while later it will be possible to modify L1 or some of these parameters in a different usage scenario.

FIG. 5 to FIG. 9B show different embodiments of an executive variation of the invention, where the element interacting with the fluid flow is not only oscillating but rotates also as a whirl.

In this concept, the principle of the mechanical interaction element with a fluid flow according to the previous embodiments is extended to a rotating windmill made of 3 of more blades and with a rotating axis belonging to a plan in the pipeline cross section, coupled with a specific element (conveyor) intended to enable its rotation and to eliminate the inconvenient of "dead" rest position of the wind-wheel, hindering or preventing the latter to start rotating from a rest position.

A longitudinal pipeline section [1] with a rotating windmill [2] is reported, with a fluid streaming from left to right. In this embodiment, the windmill has four blades [4] connected at their edge with a shaft [5] that also represent the rotating axis and the symmetry axis of the wind-wheel [2]. The shaft belongs to the plan transversal to the pipeline section and symmetrical to the pipeline profile. For the specific embodiment of a cylindrical pipeline, the shaft lies along the diameter of the pipelines section; for a rectangular section pipeline, the shaft will lay along the major or the minor symmetry axis of the rectangular cross section.

Because of the symmetry, the wind-wheel can only rotate when the fluid is asymmetrically impinging on the blades. That is commonly achieved by an upstream fluid conveyor.

Figure 5A:
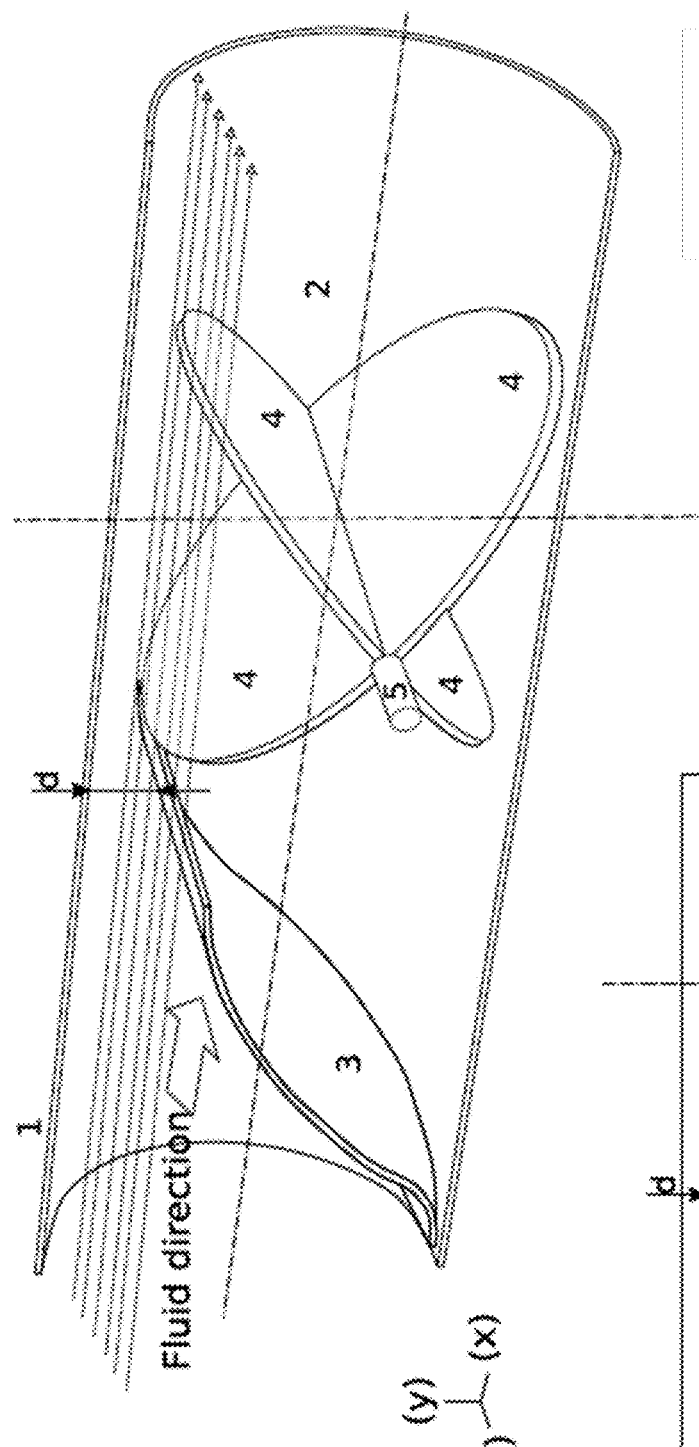
FIG. 5A and FIG. 5B show a schematic view of a further executive variation where the interacting element is a multi-wing or multi-blade whirl, in particular a whirl with four blades positioned as in a cross among them, departing from the same rotation axis.
Figure 5B:
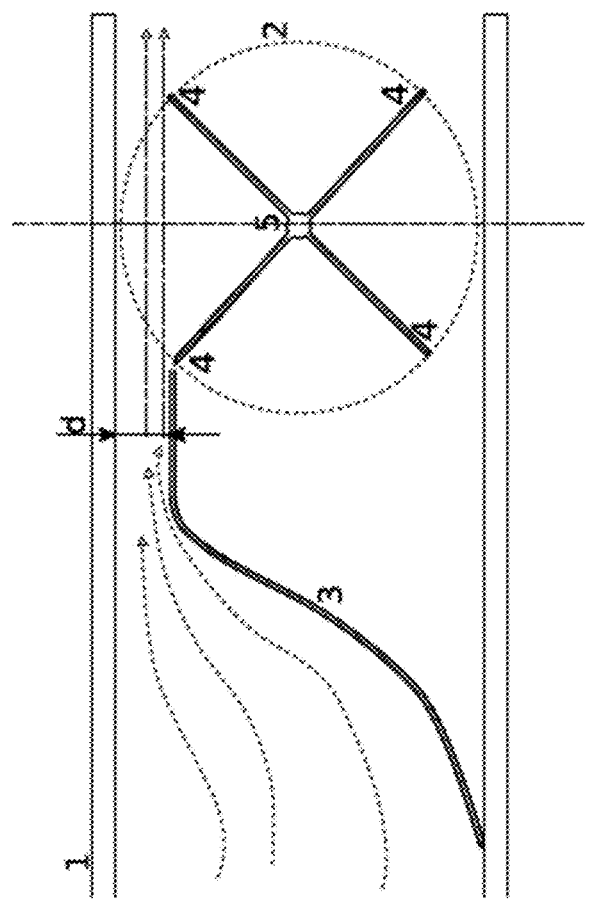

In FIG. 5, a longitudinal cross section of a conveyor [3] is reported. The fluid coming from the left is conveyed through a nozzle slit of opening width (d) and its velocity and local increases according to well-known laws of physics. The windmill will rotate as effect of energy transfer from the fluid to the upper blades, closer to the conveyor's exit nozzle.

When the wind-wheel is rotating, the rotation inertia will act in a way that at least one blade will be in the active fluid zone outside the conveyor's nozzle, sustaining the rotation. Anyway, when the wind-wheel is at rest and the fluid impact is needed to start its rotation, the wind-mill geometry is such that rest positions are possible where a gap may exist between the outer edge of the blades and the pipeline edge, as in the case of FIG. 5. In this case, the impinging fluid will mostly miss the blades and will result in delayed rotation start-up or no start-up at all.

This issue is particularly serious for two major reasons:

Even if it can mitigated by increasing the number of blades, a larger number of blades will increase the wind-wheel's weight and momentum of inertia, making the rotation more difficult to start and less effective in terms of energy harvesting. In particular, for application with low-pressure gas or slowly-moving fluids, an higher number of blades must be avoided Wind-wheels with an odd number of blades can exhibit more fixed and predictable rest position, because of weight. Even if this could mitigate the effect, asymmetric weight is again an additional obstacle to start the rotation and also to prevent the system to be freely installed in horizontal, vertical or other position.

The proposed improved embodiment of FIG. 6 solves the above drawback with a specific design of the conveyor's [3] exit nozzle [6] whose section d is reported in FIG. 6, coupled with its specific orientation to the wind-wheel shaped interaction organ with the fluid.

The nozzle [6] is made in a way that its inner volume is limited by two parallel surfaces at distance [d] that are also parallel to the plan containing the rotation axis [5] of the wind-wheel [2].

For a given position of the wind-wheel [2], the position and the orientation of the nozzle [6] is identified by the couple of coordinates:

β: shorter distance of the nozzle cavity from the axial pipeline's plan that also contains the wind-wheel rotation axis α: angle between the afore-mentioned plan and the nozzle's plans Where β and α are in such a relation that the plan (γ containing one of the nozzle surface is set to also contain the edge of two consecutive blades [4] of the wind-wheel and the plan (γ') of the other nozzle surface crosses the same two blades.

In this configuration, and for a wind-wheel with any number of blades strictly larger than 2, the value of the angle α is uniquely specified by the choice of β. The resulting configurations ensure that there is no steady position for the wind-wheel preventing the incoming flow to knock one blade at least and trigger the rotation.

This solution of specific nozzle shaping and orientation completely fixes the issue described above and enables more effective utilization in particular of even-blades wind-wheels for fluid energy harvesting. FIG. 6 shows the specific embodiment of a 4-blades wind-wheel.

This invention describes a specific arrangement to improve and adapt the established technique of transforming rotating movement into electrical energy by means of coils inside a magnetic field, specifically addressing the issue of optimizing the efficiency of energy harvesting for a fluid moving in a pipeline or any kind of closed conduit.

This invention applies to all energy harvesting wind-wheels made by any number N of blades, with N strictly larger than 2, as well as to the butterfly oscillating wing described in the claims above. The idea is directly optimized and more effective when N is even.

According to a further aspect of the present invention the embodiments of FIGS. 7 to 9B relates to optimizing energy harvesting by combining:
specific design of the wind-wheel and its composing blades,
coupled with specific configuration of the magnetic field B embedding the wind-wheel. The energy harvesting of the fluid movement requires a rotating coil embedded in a magnetic field. One possible configuration would be flattening the coil on the plan wings of the rotating element [2] centred a the rotation axis [5] and then apply a fixed magnetic field, transversal to the conveyed fluid direction and spanning the whole rotation volume of the wing.

Such coil could be placed on the surface of the wing or the surface itself could be made by several, superposed and connected thin coil layers, increasing the surface of the concatenated magnetic flow.

Such solutions have several issues making them impractical and ineffective for the present goal of fluid energy harvesting inside a pipeline, the more important ones we can be listed below:

1. From the dynamic standpoint, a flat rotating surface is the same as a particular wind-wheel as in FIG. 5, with only two opposite blades, each one representing one half of the surface. As explained before, this system would be highly inefficient when it comes to initiate rotation, and not optimized for condition when the fluid has low energy (pressure) or can be intermittent.

2. In case of adding more blades to the rotating surface to improve efficiency, these ones would cross the surface in the axis, and would bear a complicated coil design to grant electrical conductivity between the two half-coils of the active surface.

3. The produced electricity would be alternated which the same period as the rotating element's. The peaks would correspond to the positions where the surface is perpendicular to the direction of the magnetic field. One consequence is that, even if we may be able to add more blades as described above to make the rotation more efficient, such new blades could not embed additional coils, because the current that the additional coil would produce would interfere with the former zeroing the benefit and creating anomalies in the wind-wheel rotation as an effect asymmetrical self-inductance.

For these reasons, leveraging on a simple rotating coil for the specific need of fluid energy harvesting in a wind-wheel, would result either completely unsuccessful or highly impractical and cost-bearing, at least.

The embodiments of FIGS. 5 and 6 improve the device allowing to overcome the above problem.

Figure 8:
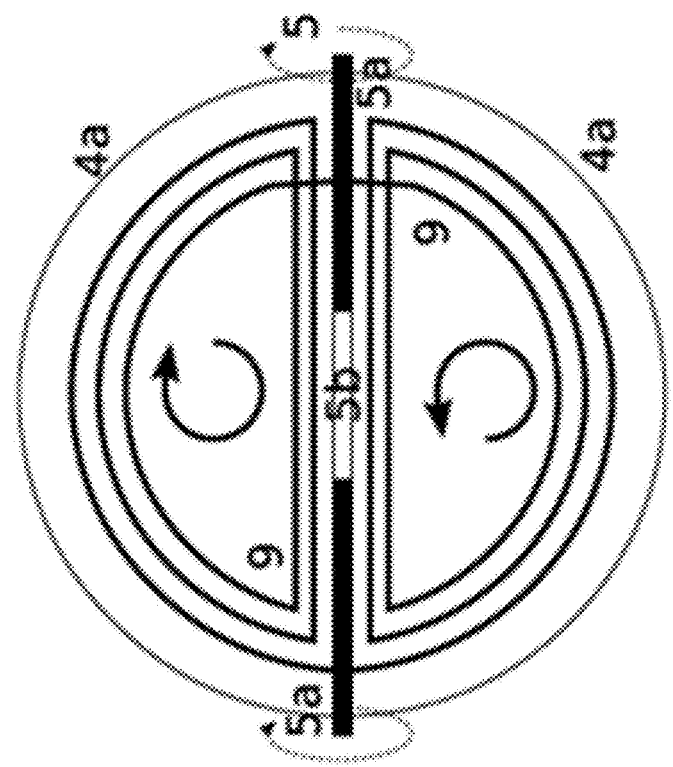
FIGS. 7 and 8 show two variations of the placement of the coil or coils generating the induction signal.
Figure 7:
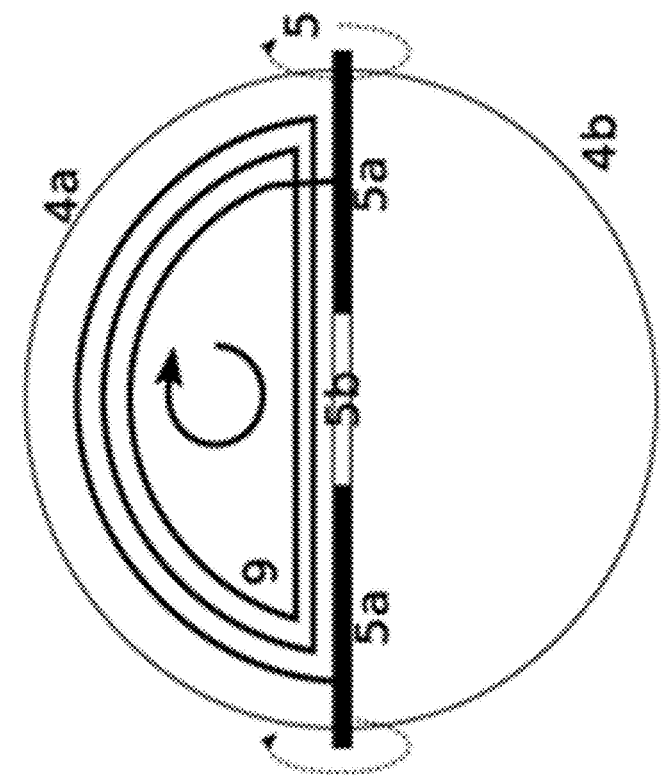
Figures 9A, 9B:
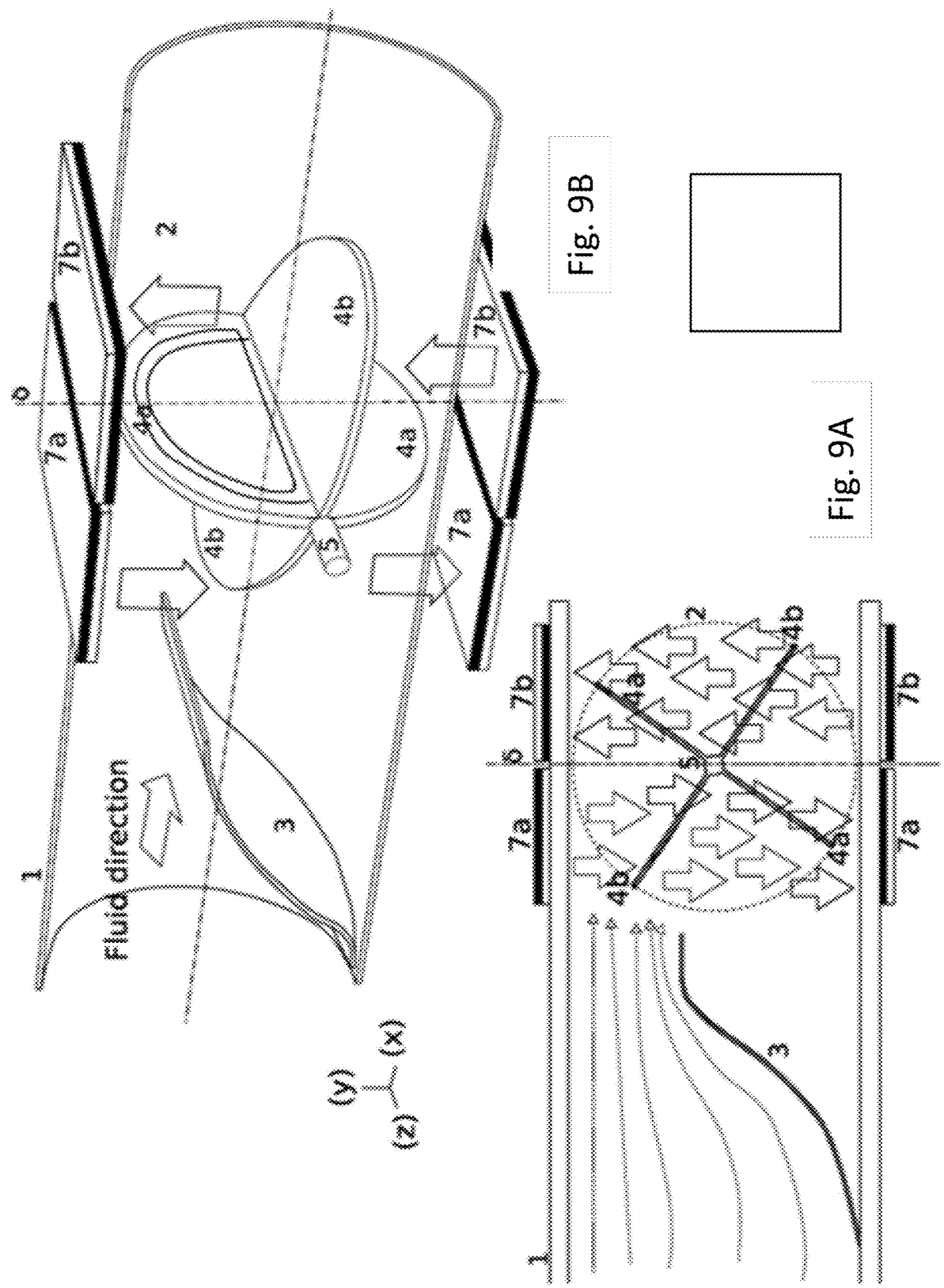
FIGS. 9A and 9B show an embodiment with a conveyor as the one depicted in FIG. 5 in combination with an interacting element with blades with coils like in the example of FIG. 7, the magnetic field and the magnets In this description and in the claims, the definition "element mechanically interacting with the fluid flow" can have any embodiment.

According to the improvement of FIGS. 7 and 8, the coil is put entirely on a blade [4] of the wind-wheel [2], not allowing the circuit to trespass its rotation axis. The two extremities of the coil are electrically connected to the two extremities of the wind-wheel's conductive shaft collecting the coil induced current. In FIG. 7 the particular embodiment for a 4-blades wind-wheel is reported, for the case of a cylindrical pipeline.

In such embodiment case in which the device is housed in a pipe having a circular cross section, each blade [4] is a semi-circle connected to the shaft [5]. In case of a different section of the pipeline, the blade's shape would vary accordingly, I order to maximise its surface across the pipeline's cross-section.

The active blade [4a] contains a coil [19] whose ends are connected to the conductive extremities [5a] of the rotating shaft. The shaft [5] is therefore composed by a central, electrically isolating section [5b] and the two conductive ends [5a]. In this embodiment, the opposite blade [4b] is not conductive, while the remaining two are perpendicular to this cross-section.

This solution enables the more effective embodiment of FIG. 8, where two active blades [4a] can be placed opposed to the shaft, with both the coils connected to the conductive elements of the shaft. This configuration maximises the coil surface exposed to the magnetic field and the energy harvesting efficiency.

The active blades are mounted in a way that the coil configuration as seen from the magnetic field is exactly the same after a rotation of 180° of the wind-wheel [2].

Because of that, and seen from above, the two coils loop in opposite direction. In this particular example, going from the left to the right of the shaft [5], the current would loop clockwise in the blade above and anti-clockwise in the opposite one.

Because of the symmetry, a further improvement allowing to further optimize harvesting consists of a magnetic field constant in time but variable in the space, such that it inverses its polarity when crossing the plane representing the pipeline's cross-section and containing the wind-wheel rotating axis. In FIG. 9 an embodiment is shown.

The fluid flow passing through the conveyor [3] puts the wind-wheel [2] in rotation. The wind-wheel is here made of 4 blades: two opposite, active blades [4a], whose coils are electrically connected to the rotating shaft [5], and 2 passive blades [4b], enabling a smooth rotation of the wind-wheel [5]. A transversal magnetic field is generated by two separated set of magnets [7a] and [7b], set at the opposed side of the plane [δ], cross-section of the pipeline [1] and containing the shaft [5]. If the magnetic field generated by the magnets [7a] goes from N to S, then the one generated by the magnets [7b] goes from S to N, and vice-versa. As a result, the overall magnetic field will be zero or almost zero close to the [δ] plane, and more intense farer from it, alongside the coils' rotation paths. generating it are also shown.

The invention claimed is:

1. A transducer device of fluid-dynamic energy into electrical energy, usable as flow meter or as an energy harvester, comprising:
   a mechanical element interacting with a flowing fluid, supported to at least oscillate in a plane with a component parallel to flow direction and another component transverse or orthogonal to a surface transversal to the flow direction and belonging to the mechanical element, wherein the mechanical element is brought into oscillation or vibration by the fluid flow, by way of one or more elastic suspending elements;
a magnetic induction electromotive force generator, including at least a magnetic flow generator, the flow crossing at least an electric conductor;
the conductor being dynamically connected to the mechanical element that mechanically interacts with the fluid and is moved across a magnetic field by an oscillating or vibrating motion of the mechanical element, thus experiencing an induced current;
at least one collection unit for an electrical signal generated by induction in the conductor, electrically connected to ends of the conductor,
wherein the mechanical element is suspended oscillating around an axis transversal to the flow direction and corresponding to a transversal axis half way along the mechanical element;
a frame that supports a rotation shaft at its ends; and
elastic members provided in a direction of rotation, with respect to the rotation around the shaft.

2. The transducer device according to claim 1, wherein the rotation shaft is a central shaft in a projection of a shape of the mechanical element on a cross-section plane of the fluid flow and corresponds to a central diametrical axis on a transversal section of the fluid flow.

3. The transducer device according to claim 1, wherein the elastic members acting on the rotation of the shaft are helicoidal springs.

4. The transducer device according to claim 1, wherein the conductor is an induction coil or coils shaped as a spiral or spirals on a plane or any other surface and fixed on a surface of the mechanical element, or embedded, included or integrated in it therein.

5. The transducer device according to claim 4, where the magnetic field is steady and homogeneous in intensity, having a stable orientation and direction.

6. The transducer device according to claim 5, wherein an electrical connection of the coil takes place through the ends of the rotation shaft, originating from diametrically opposed sides of the mechanical element, of electrically conductive material, connecting on one side the coil with on the other side an induction generated electrical signal collecting unit.

7. The transducer device according to claim 6, wherein the transducer device is mounted inside a pipe or a restraint duct for the fluid, inserted between two flow conveyors generating a difference of fluid flow density, according to the flow direction along a section of the pipe or restraint duct, increasing a density of the fluid flow proportionally to a radial distance from the rotation shaft.

8. The transducer device according to claim 6, further comprising a control unit joined or integrated in the signal collecting unit, which cuts current extraction from the coil to avoid a damping of oscillations.

9. The transducer device according to claim 7,
wherein the transducer device is set inside the pipe or restraint duct, while the collecting unit is set outside the pipe or restraint duct, and
wherein the electrical energy is transferred from the coil through the pipe's or restraint duct's wall to the collection unit, with capacitive coupling between a first terminal connected to the coil inside the pipe or restraint duct and a second terminal connected to the collection unit external to the pipe or restraint duct.

10. A transducer device to transform dynamic energy into electrical energy usable as flow meter and or as an energy harvester, comprising:
a mechanical interaction element with a fluid flow, supported in an oscillating way and brought into oscillation or vibration by the fluid flow, by one or more elastic suspending elements;
a magnetic induction electromotive force generator, including at least a magnetic flow generator, the fluid flow crossing at least an electric conductor;
wherein the conductor or coil is dynamically connected to the mechanical interaction element and is moved across a magnetic field by an oscillating or vibrating motion of the mechanical interaction element, thus experiencing an induced current;
at least one collection unit for an electrical signal generated by induction in the electric conductor, electrically connected to ends hereof,
wherein an electrical connection is achieved by at least part of suspending elastic elements, which are made of an electrically conductive material, and connect the electric conductor with the collection unit for the electrical signal, and
wherein a control unit automatically cuts out electrical energy extraction from the electric conductor, to avoid a damping or reduction of the oscillations.

11. The transducer device according to claim 10, wherein the control unit includes:
a memory where at least a minimum threshold of voltage or current value of the electrical signal extracted from the magnetic flow generator can be set;
a unit measuring current or voltage value of the electrical signal extracted from the magnetic flow generator;
a comparator of the measured current or voltage value with a pre-set threshold current or voltage;
a cutter of electrical connection between the magnetic flow generator and the control unit, driven by a comparing unit, which cuts off the electrical connection when the measured current or voltage value reaches or goes below the pre-set threshold value.

12. The transducer device according to claim 11, where the minimum threshold of voltage or current value is defined as an intermediate value between a theoretical ideal current or voltage value of an induced signal in electric connector due to the oscillations of a wing and a current or voltage value corresponding to condition in which energy extraction damps amplitude and/or frequency of the wing oscillations to an extent to reduce close to zero the energy that can be extracted.

13. The transducer device according to claim 10, wherein where the mechanical interaction element is suspended and free to rotate around a rotation shaft whose orientation has at least one wing providing a directional component transversal to fluid flow direction.

14. The transducer device according to claim 13, wherein the mechanical interaction element has two wings stretching in opposite directions with respect to the rotation shaft.

15. The transducer device according to claim 13, where the mechanical interaction element has three or more wings, radially departing and extending outwards from a common rotation shaft.

16. The transducer device according to claim 13, further comprising at least a fluid flow conveyor in combination with the mechanical interaction element, the fluid flow conveyor including at least a transversal section, which has a convergent profile and ends with an exit duct, an ideal extension of which is oriented with a predefined angle with respect to a wing parallel to the flow direction and intersecting a radially external end border of the wing in relation to the rotation shaft.

17. The transducer device according to claim 13, wherein the at least one wing bears at least one coil, formed by one or more turns, being the rotation shaft given by two conductive material terminals, connected one to the other by an intermediate segment of non-conductive material, the coil having ends connected respectively to one of two conductive ends of the rotation shaft.

18. The transducer device according to claim 13, wherein the magnetic flow generator is configured to generate a magnetic field which is oriented orthogonally to the rotation shaft of the mechanical interaction element and to the direction of the fluid flow, and wherein magnetic field direction on a side of an ideal plane coincident with the rotation shaft and perpendicular to the direction of the fluid flow, opposite to the one on the opposite side.

19. The transducer device according to claim 18, wherein intensity of the magnetic field decreases by getting closer to the ideal plane coincident with the rotation shaft and perpendicular to the direction of the fluid flow.

\* \* \* \* \*